United States Patent
Horswill et al.

(10) Patent No.: US 7,493,752 B2
(45) Date of Patent: Feb. 24, 2009

(54) CONTROL SYSTEM FOR AIRCRAFT ENGINE

(75) Inventors: Michael A Horswill, Chester (GB); Stephen G Garner, Ashby de la Zouch (GB)

(73) Assignee: Rolls-Royce plc, London (GB)

( * ) Notice: Subject to any disclaimer, the term of this patent is extended or adjusted under 35 U.S.C. 154(b) by 571 days.

(21) Appl. No.: 11/342,838

(22) Filed: Jan. 31, 2006

(65) Prior Publication Data

US 2006/0283191 A1 Dec. 21, 2006

Related U.S. Application Data

(63) Continuation-in-part of application No. 10/679,262, filed on Oct. 7, 2003, now abandoned.

(30) Foreign Application Priority Data

Oct. 16, 2002 (GB) .................................. 0224039.8

(51) Int. Cl.
*F02C 9/28* (2006.01)

(52) U.S. Cl. ..................................... 60/243; 60/39.281
(58) Field of Classification Search ............. 60/39.281, 60/233, 235, 243
See application file for complete search history.

(56) References Cited

U.S. PATENT DOCUMENTS

| | | | | |
|---|---|---|---|---|
| 4,397,148 A | * | 8/1983 | Stockton et al. | 60/223 |
| 5,133,182 A | * | 7/1992 | Marcos | 60/792 |
| 6,655,126 B2 | * | 12/2003 | Walker et al. | 60/243 |
| 7,096,657 B2 | * | 8/2006 | Mahoney et al. | 60/39.25 |

* cited by examiner

*Primary Examiner*—Louis J Casaregola
(74) *Attorney, Agent, or Firm*—W. Warren Taltavull; Manelli Denison & Selter PLLC

(57) ABSTRACT

A control apparatus 50 for a gas turbine engine for an aircraft includes engine control means 52 forming part of an outer fuel control loop and fuel control means/overthrust protector 76 forming part of an inner fuel control loop. Overthrust protection is provided within each of the engine control means 52 and the fuel control means/overthrust protector 76, which are powered and housed separately. Thus, a failure within one of these systems could not result in overthrust and demonstrably reliable overthrust protection is provided within a single channel.

13 Claims, 4 Drawing Sheets

CONTROL SYSTEM FOR AIRCRAFT ENGINE

This application is continuation-in-part of U.S. appplication Ser. No. 10/679,262 filed Oct. 7, 2003, now abandoned.

The invention relates to a control apparatus and method for protecting against overthrust in an engine for an aircraft.

Overthrust is a condition in which an aircraft engine produces excessive thrust which cannot be alleviated by movement of the throttle. The condition can occur in respect of thrust level or thrust direction (where the engine produces forward thrust even though the thrust reversers have been commanded to deploy but have failed).

Overthrust is a condition at the engine level that leads to an event at the aircraft level which is defined as catastrophic. This means that new control systems are obliged to be designed such that a single physical or functional failure cannot result in overthrust and such that there is an extremely remote likelihood of the occurrence of overthrust due to multiple failures.

In a typical dual channel control system, it is difficult to demonstrate satisfactorily that a single failure could not produce overthrust. This is primarily due to the lack of adequate independence between control of thrust and protection against overthrust.

In view of the above, an aircraft cannot safely operate on a single channel because it is necessary that each channel effectively cover for any faults in the other channel.

In a single channel control system, it is not possible to demonstrate that a single failure could not produce overthrust.

According to the invention there is provided a control apparatus for an aircraft engine, the control apparatus including:

engine control means including:

means for receiving a signal representative of a desired thrust for the engine;

means for receiving a signal representative of the actual thrust of the engine; and means, such as a computer, for analysing the above signals and for producing a signal representative of a desired fuel flow for the engine; and fuel control means including:

means for receiving a signal representing a desired fuel flow;

means for providing a signal to a fuel monitoring means for regulating the flow of fuel to the engine;

means for receiving a feedback signal from the fuel monitoring means; and means for analysing the signal representing desired fuel flow and the feedback signal from the fuel monitoring means and adjusting the signal to the fuel monitoring means, for achieving the desired fuel flow;

wherein the engine control means and the fuel control means are separately powered, for example, by separate batteries, such that a failure of the power supply to one of them will not necessarily result in a failure of the power supply to the other.

Preferably the engine control means and the fuel control means are also physically separated. The physical separation may take the form of a physical barrier such as a metal plate. The engine control means and the fuel control means may be provided within separate housings allowing limited communication of data therebetween.

The control apparatus may further include selection means for receiving first and second signals each representing a desired fuel flow and selecting the lower of the two. The fuel control means may receive the selected lower desired fuel flow signal.

The first signal representing desired fuel flow may be produced by the engine control means.

The second signal representing desired fuel flow may be produced by a protector means. The protector means is preferably powered separately from the engine control means. The protector means preferably includes means for receiving a signal representing engine thrust, which may comprise a signal representing engine speed, and a signal indicating whether a throttle of the engine is at idle or in reverse and the thrust reversers not deployed. The protector means preferably further includes means for calculating a maximum desired fuel flow demand appropriate for the above conditions.

The signal representing desired thrust, received by the engine controller, may be a signal indicating a desired engine speed, for example a desired low pressure shaft speed. Alternatively, the signal may be a pressure signal and/or a temperature signal.

The signal representing actual thrust, received by the engine controller, may be indicative of engine speed, for example low pressure shaft speed, or of pressure and/or temperature within the gas turbine engine.

The engine control means may include means for determining whether the comparative values of the signals representing actual thrust of the engine and the desired thrust of the engine suggest overthrust, possibly caused by failure of the fuel control means. Preferably the engine control means includes means for reducing or preventing fuel flow to the engine in such circumstances. These means may include means for closing a shut-off valve. The engine control means may electrically drive the shut-off valve. By way of example, the shut-off valve may be operated by a solenoid device that is connected to an electric source such as a battery or battery pack through a switch that the engine control operates.

The control apparatus may further include fuel monitoring means, which may comprise a fuel metering valve, the position of which may be controlled by the signal from the fuel control means. The protector means may electrically drive the fuel metering valve. The fuel metering valve may be adjusted by a torque motor. The control apparatus may further include means for monitoring the position of the fuel metering valve. These means may include a linear variable differential transformer, which may produce a feedback signal representative of the position of the fuel metering valve. This feedback signal may be the feedback signal received by the fuel control means.

The fuel metering valve position preferably controls the fuel flow to the engine, thereby controlling the thrust of the engine.

According to the invention there is further provided an aircraft including a control apparatus as defined in any of the preceding ten paragraphs.

An embodiment of the invention will be described for the purpose of illustration only with reference to the accompanying drawings in which:—

Figure 3:
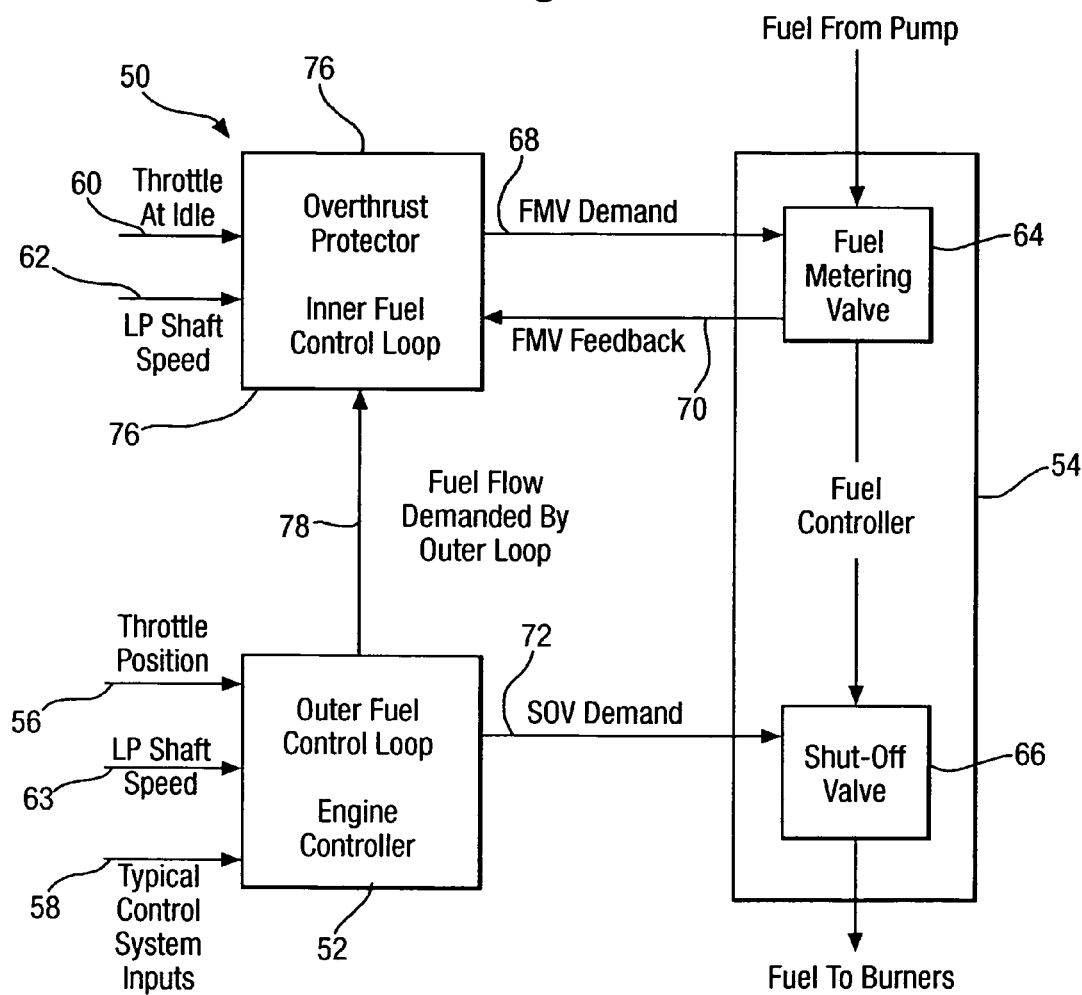
Figure 4:
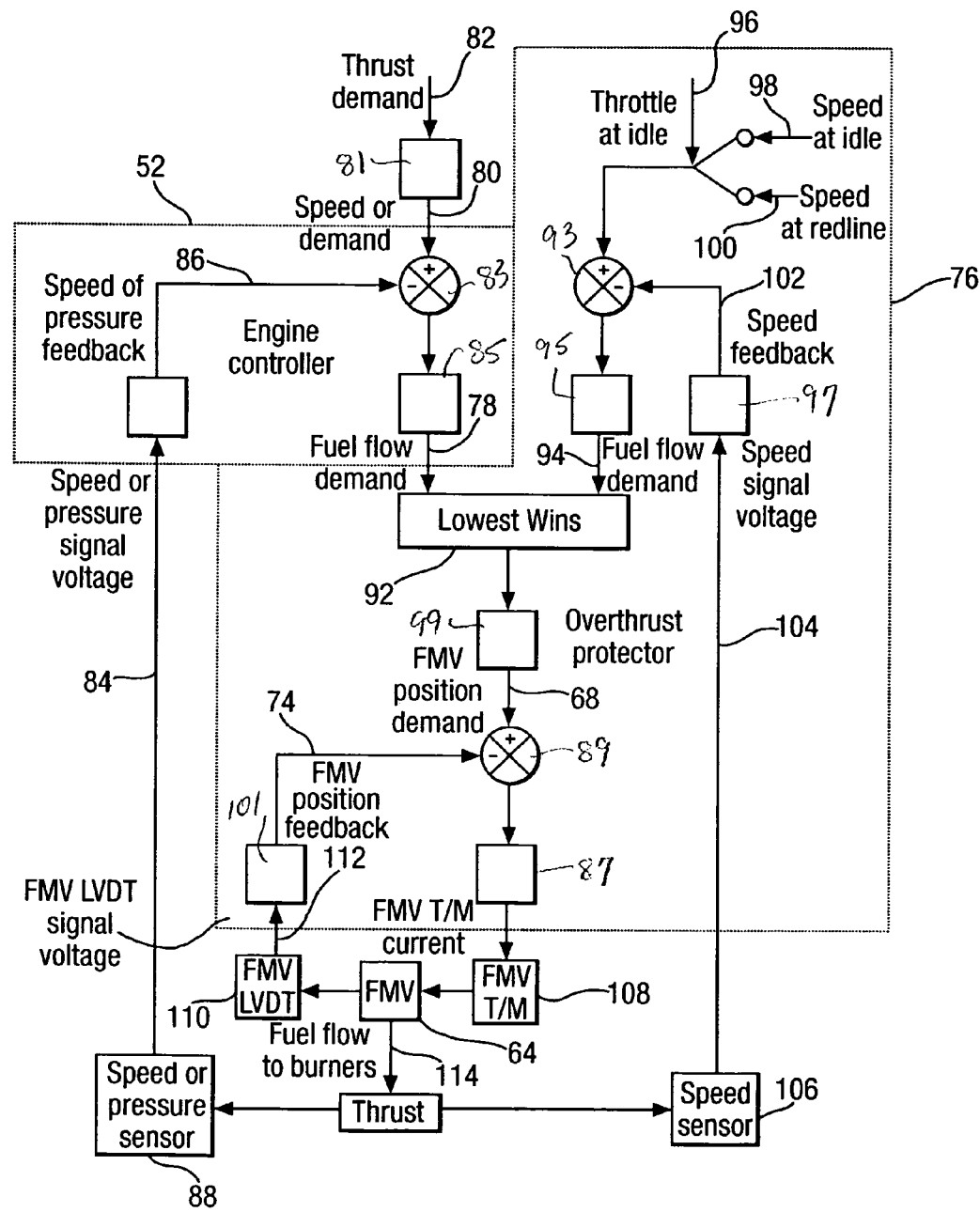

FIG. 3 is a highly simplified block diagram representing a single channel control system according to the invention; and FIG. 4 is a block diagram representing a single channel control system according to the invention, illustrating the interaction between the inner and outer fuel flow control loops and engine thrust in detail but omitting the interaction between the engine controller and the shut off valve.

Figure 1:
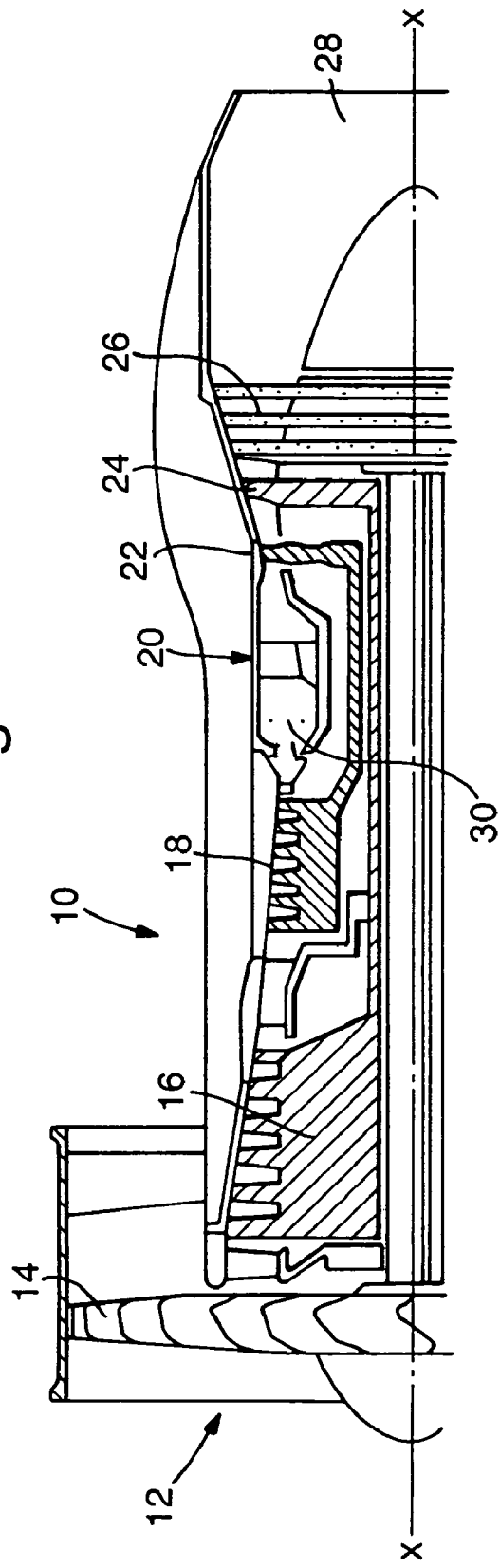
FIG. 1 is a diagrammatic cross-section through a gas turbine engine suitable for control by a system according to the invention.

With reference to FIG. 1 a ducted fan gas turbine engine generally indicated at 10 comprises, in axial flow series, an air intake 12, a propulsive fan 14, an intermediate pressure compressor 16, a high pressure compressor 18, combustion equipment 20, a high pressure turbine 22, an intermediate pressure turbine 24, a low pressure turbine 26 and an exhaust nozzle 28.

The gas turbine engine 10 works in the conventional manner so that air entering the intake 12 is accelerated by the fan 14 to produce two air flows, a first air flow into the intermediate pressure compressor 16 and a second airflow which provides propulsive thrust. The intermediate pressure compressor 16 compresses the air flow directed into it before delivering the air to the high pressure compressor 18 where further compression takes place.

The compressed air exhausted from the high pressure compressor 18 is directed into the combustion equipment 20 where it is mixed with fuel and the mixture combusted. The resultant hot combustion products then expand through and thereby drive the high, intermediate and low pressure turbines 22, 24 and 26 before being exhausted through the nozzle 28 to provide additional propulsive thrust. The high, intermediate and low pressure turbines 22, 24 and 26 respectively drive the high and intermediate pressure compressors 16 and 18 and the fan 14 by suitable interconnecting shafts.

Figure 2:
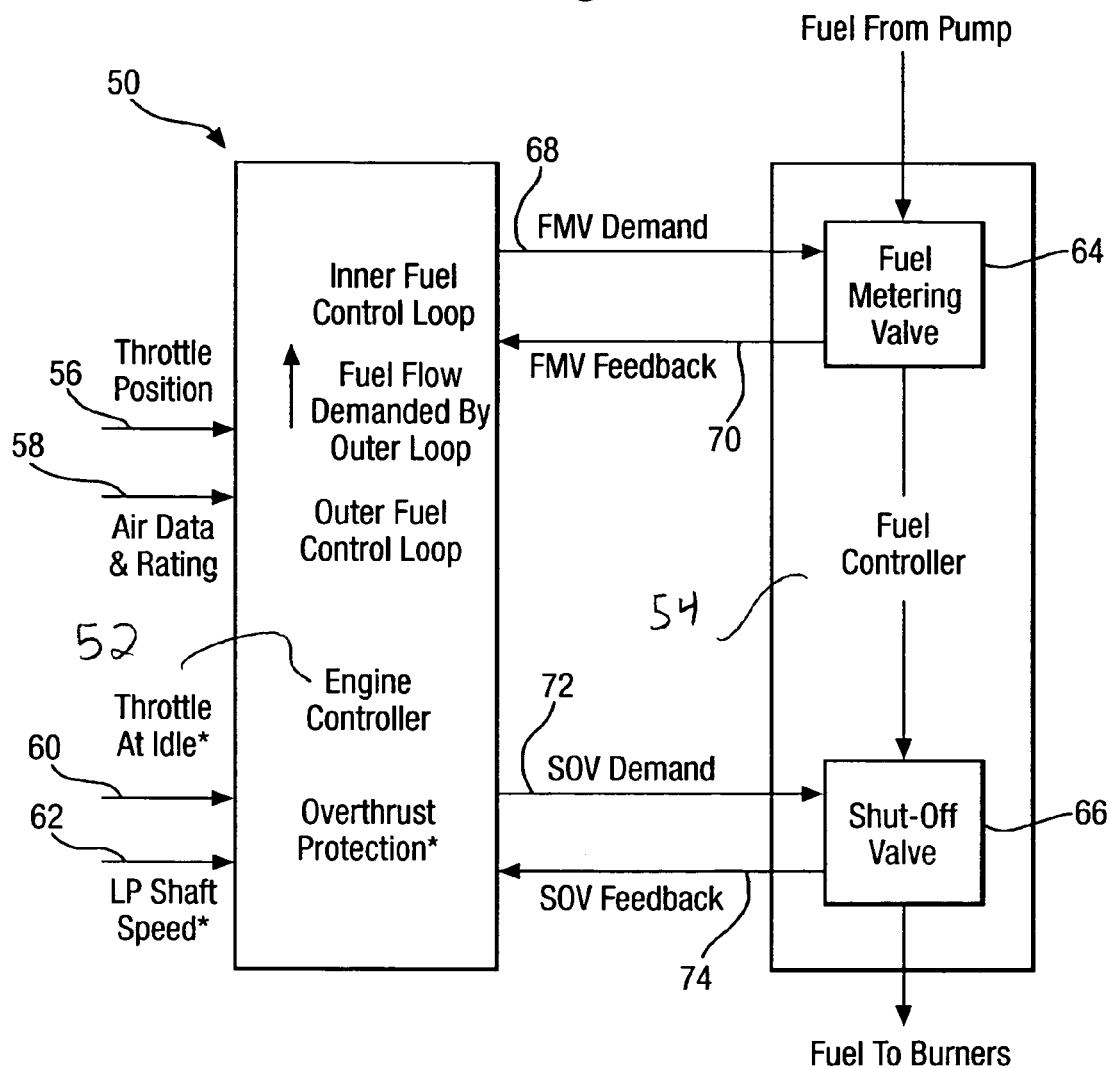
FIG. 2 is a block diagram representing a single channel, prior art control system.

The thrust produced by the engine is controlled by adjusting the flow of fuel to burners (not illustrated) of the combustion equipment 20. FIG. 2 illustrates a known engine control system 50, including engine control means 52 and fuel control means 54.

Referring to FIG. 2 the engine controller 52 has inputs including a throttle position 56 and air data and rating 58. These are the basic inputs which enable the engine controller to determine the fuel flow required by the engine. The engine controller also includes a throttle at idle input 60, this being a simple on/off signal indicating whether or not the throttle is at idle, and a low pressure shaft speed signal 62. The function of these signals will be described below.

The fuel controller 54 includes a fuel metering valve ("FMV") which is able to control the amount of fuel being passed to the burners of the aircraft engine combustor. The fuel controller also includes a shut-off valve ("SOV") 66, being a simple on/off valve which is open during operation but which is moved into the closed position at the end of a flight or, for example, in the event of a malfunction of the fuel metering valve. As previously indicated, the fuel metering and shut-off valves may each be solenoid operated although other operators may be employed within the scope of this invention.

Various signals pass between the engine controller and the fuel controller. These include an FMV demand signal 68 and an FMV feedback signal 70. The means for receiving these and other signals may include a computer using a program that monitors computer inputs from the various signal generating devices in the engine. These are conventional and well understood in this area. The computer, as described below, will be able to analyze the input signals by means of software running on the computer. In addition an SOV demand signal 72 and an SOV feedback signal 74 pass between the engine controller and the shut-off valve.

In operation, the engine controller has a computer 52 which analyses the throttle position and the air data and rating to determine the rate of fuel required by the engine. The engine controller computer 52 produces a resulting FMV demand signal 68, such an electrical pulse or pulses which pass to the fuel metering valve 64 operating device such as a solenoid within the fuel controller 54. The fuel metering valve is moved to an appropriate position for this rate of fuel consumption and the fuel is then supplied to the burners, via the shut-off valve 66 which is open in operation. The FMV feedback signal is continually monitored by the engine controller computer and the FMV demand signal adjusted accordingly.

The control system 50 has certain adaptations to protect against overthrust. As described previously, overthrust is a condition in which the engine produces excessive thrust which cannot be alleviated by movement of the throttle. The engine controller checks the low pressure shaft speed signal 62 and the throttle at idle signal 60. If the throttle is at idle, the low pressure shaft speed should respond to the throttle and should be reducing or below a threshold and not increasing and above a threshold. The threshold is idle plus a margin. If the low pressure shaft speed is not reducing, this indicates an overthrust situation and the engine controller therefore sends a signal along line 72 causing the shut-off valve to move into the closed position. This stops fuel flowing to the burners.

It may be seen that in the above system, the engine controller computer 52 provides the FMV demand signal 68 and also the SOV demand signal 72. Therefore an error in the engine controller which resulted in overthrust could theoretically also result in the engine controller not providing the SOV demand signal correctly. Thus, it can be demonstrated that a single failure in the above system, for example in the power supply to the engine controller, could cause an overthrust situation.

FIGS. 3 and 4 illustrate a control system 50 according to the invention, FIG. 3 providing abroad overview and FIG. 4 being more detailed but omitting the interaction between the engine controller and the fuel controller SOV. Referring initially to FIG. 3, it may be seen that the engine controller computer 52 is provided with control system inputs 58, a low pressure shaft speed signal 62 and a throttle position signal 56. The engine controller 52 may be regarded as forming part of an outer fuel control loop.

An overthrust protector 76 includes a throttle at idle input 60 and a low pressure shaft speed signal 62. The low pressure shaft speed signal 62 for the overthrust protector is independent of the low pressure shaft speed signal 63 of the engine controller. The overthrust protector 76 may be regarded as forming part of an inner fuel control loop. The inner fuel control loop includes an FMV demand signal 68, passing between the overthrust protector 76 and a fuel metering valve 64, and an FMV feedback signal 70 passing from the fuel metering valve 64 to the overthrust protector 76.

The fuel metering valve 64 is provided within fuel control means 54, which also includes a shut-off valve 66. The shut-off valve is controlled from the engine controller 52 via an SOV demand signal 72. Here, conventional solenoid type valve operators may be used as these, as well as other operators, can be readily actuated by electrical or magnetic signals.

In operation, the engine controller 52 monitors the throttle position signal 56 and the low pressure shaft speed signal 63, together with the control system inputs 58, to provide a signal 78, typically through an analog/digital converter 85 from a summing junction 83, representative of the fuel flow required by the engine. This signal passes to the overthrust protector 76. In normal operation, the fuel flow demand signal 78 is translated by the overthrust protector 76 into an FMV demand signal 68, which comes from the lowest wins gage comparator 92 and then through an analog/digital converter 87 and a summing junction 89. However, the overthrust protector 76 also monitors the throttle at idle signal 60 and its low pressure shaft speed signal 63. If the throttle is at idle, the low pressure shaft speed should be decreasing or below a threshold, as mentioned previously. If this is not the case, the overthrust protector detects an overthrust situation and overrides the fuel flow demanded by the engine controller. In this case the overthrust protector 76 provides an FMV demand signal in line with a reasonable demand based on the low pressure shaft speed and throttle at idle signal. As FIG. 4 indicates, the thrust demand signal 82 will be a continuous input during flight while the throttle at idle signal 96 will be a discrete input indicating whether the throttle is at idle or not. When not at idle, the throttle signal will revert to the speed at redline 100 which will be greater than the thrust demand signal and its related fuel flow 78. As a consequence, the comparator 92 will pass the thrust demand signal 82 to an analog/digital converter 99. According to the method of this system, the overthrust preventer 76 will derive a throttle condition signal based on speed such as shaft speed at 98, corresponding to throttle at idle and at 100 which may correspond to the throttle set to achieve a maximum or redline speed. As noted above, the throttle at idle speed is a discrete input to the system whereas once set, the system will revert to the higher speed 100 which allows the typically lower value of the thrust demand signal to pass the comparator, or lowest wins gate, 92.

Should there be a failure in the overthrust protector 76, resulting in overthrust, the engine controller 52 will detect this by monitoring the low pressure shaft speed signal 62 and the throttle position signal 56. If the throttle is at idle, the low pressure shaft speed should be decreasing or below a threshold and, if this is not the case, the engine controller is able to detect overthrust and send a signal down line 72 to operate the shut-off valve. This therefore prevents fuel from flowing to the burners.

FIG. 4 illustrates part of the above system in somewhat more detail. It may be seen that the engine controller 52 is provided with a speed or pressure demand signal 80 resulting from a thrust demand, represented by the arrow 82. This is generally equivalent to the throttle position signal 56 in FIG. 3. The engine controller 52 also receives a speed or pressure voltage signal 84 which is converted, such as through an analog/digital converter 91, into a speed or pressure feedback signal 86. The speed or pressure voltage signal is derived from a speed or pressure sensor 88 provided within the aircraft engine.

The engine controller uses the speed or pressure demand signal 80 and the speed or pressure feedback signal 86 to calculate a fuel flow demand, which is output as a first fuel flow demand signal 78.

The first fuel flow demand signal 78 is input into the comparator 92 within the overthrust protector 76. The comparator 92 is also provided with a second fuel flow demand signal 94 indicative of a fuel flow limit. The second fuel flow demand signal 94 is provided by the overthrust protector, such as from the throttle at idle signal through a summing junction 93 and through a analog/digital converter 95. The overthrust protector includes a throttle at idle signal 96, a speed at idle signal 98 and a speed at red line signal 100. In addition, a speed feedback signal 102 is provided through an analog/digital converter 97, this resulting from a speed signal voltage 104 in turn derived from a speed sensor 106 provided within the engine. The overthrust protector is able to compare these various signals to provide a maximum fuel flow demand which the engine controller should be requesting for these conditions. This is the fuel flow demand signal 94.

The comparator 92 chooses the lower one of the two fuel flow demand signals 78 and 94. Therefore, provided that the fuel flow demand signal 78 (produced by the engine controller 52) is below the perceived maximum fuel flow demand signal 94 (as calculated by the overthrust protector 76), the fuel flow demand signal 78 is chosen by the comparator. The fuel flow demand signal 78 is then used by the overthrust protector to determine an FMV demand signal 68. The FMV demand signal 68, which derives from the comparator 92 through analog/digital converter 99, is compared with an FMV position feedback signal 74, an FMV position error which is used to control a drive current for a fuel metering valve torque motor 108. The torque motor 108 drives the fuel metering valve 64 into a desired position. A fuel metering valve linear variable differential transformer 110 converts the position of the fuel metering valve into a voltage signal 112 which is used to derive the FMV feedback signal 74 after being passed to analog/digital converter 101. This provides a closed loop control for the fuel metering valve position.

The position of the fuel metering valve 64 dictates the fuel flow to the burners of the combustion equipment (indicated by 114) and thereby controls the thrust of the aircraft engine. The thrust in turn affects the speed or pressure sensor 88 and the speed sensor 106.

It will be appreciated that if the engine controller 52 malfunctions and demands too high a fuel flow along the fuel flow demand signal line 78, this will be overridden by the fuel flow demand signal 94 (which represents a fuel flow limit) if appropriate. In this way, overthrust protection is built into this system.

Should the overthrust protector 76 malfunction, the engine controller 52 is able to detect this by monitoring the low pressure shaft speed and the signals representative of demanded thrust. If these signals indicate an overthrust situation, the engine controller sends a signal to the shut-off valve 66 (not illustrated in FIG. 4) in order to stop fuel passing to the burners.

The circuitry making up the engine controller 52 is powered by a separate power supply to the circuitry making up the overthrust protector 76. In addition, the engine controller circuitry is housed in a separate housing from the overthrust protector circuitry. The fuel flow demand signal 78 which passes between the engine controller 52 and the overthrust protector 76 is a serial digital transmission which is received by a suitably buffered input on the overthrust protector. The signal could alternatively be a parallel digital or an analogue signal.

There is thus provided a control system for an aircraft engine in which overthrust protection is provided both by the engine controller and the separate overthrust protector.

Because of the independence of the engine controller and the overthrust protector, a single failure will not result in the malfunctioning of both these systems. Both systems have overthrust protection built into them. Thus, the malfunctioning of a single one of the engine controller and the overthrust protector will not result in overthrust. This means that overthrust protection is provided fully within a single channel. Therefore, an aircraft could fly on a single channel and nevertheless have sufficient overthrust protection. In addition, because overthrust problems are generally dealt with by the comparator 92 providing an appropriate FMV demand signal, rather than by shutting off the fuel flow completely via the shut off valve, such situations may be dealt with more safely than was the case with the prior art system.

Various modifications may be made to the above described embodiment without departing from the scope of the invention. In particular, more sophisticated implementations could incorporate the calculation of a maximum limit for fuel flow in the overthrust protector for all throttle positions and also for a thrust reverser position.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. Control apparatus for an aircraft engine, the control apparatus including:
    engine control means including:
    means for receiving a signal representative of a desired thrust for the engine;
    means for receiving a signal representative of the actual thrust of the engine; and
    means for analysing the above signals and for producing a signal representative of a desired fuel flow for the engine; and
    fuel control means including:
    means for receiving a signal representing a desired fuel flow;
    means for providing a signal to a fuel monitoring means for regulating the flow of fuel to the engine;
    means for receiving a feedback signal from the fuel monitoring means; and
    means for analysing the signal representing desired fuel flow and the feedback signal from the fuel monitoring means and adjusting the signal to the fuel monitoring means for achieving the desired fuel flow;
    wherein the engine control means and the fuel control means are separately powered such that a failure of the power supply to one of them will not necessarily result in a failure of the power supply to the other.

2. Control apparatus according to claim 1, wherein the engine control means and the fuel control means are physically separated.

3. Control apparatus according to claim 2, wherein the engine control means and the fuel control means are provided within separate housings allowing limited communication of data therebetween.

4. Control apparatus according to claim 1, further including selection means for receiving first and second signals each representing desired fuel flow and selecting the lower of the two.

5. Control apparatus according to claim 4, wherein the fuel control means receives the selected lower desired fuel flow signal.

6. Control apparatus according to claim 4, wherein the first signal representing desired fuel flow is produced by the engine control means.

7. Control apparatus according to claim 4, wherein the second signal representing desired fuel flow is produced by a protector means, which is powered separately from the engine control means.

8. Control apparatus according to claim 7, wherein the protector means includes means for receiving a signal representing engine thrust and a signal indicating whether a throttle of the aircraft is idle or in reverse and the thrust reversers not deployed and means for calculating a maximum desired fuel flow demand appropriate for the above conditions.

9. Control apparatus according to claim 8 wherein the signal representing engine thrust comprises a signal reprsenting engine speed.

10. Control apparatus according to claim 1, wherein the engine control means includes means for determining whether the comparative values of the signals representing actual thrust of the engine and the desired thrust of the engine suggest overthrust and means for reducing or preventing fuel flow to the engine in such circumstances.

11. Control apparatus according to claim 1, further including fuel monitoring means which may be controlled by the signal from the fuel control means.

12. Control apparatus according to claim 11, wherein the fuel monitoring means comprises a fuel metering valve which may be adjusted by a torque motor.

13. Control apparatus according to claim 12, wherein the fuel metering valve position controls the fuel flow to burners of the combustor of the gas turbine engine, thereby controlling the thrust of the engine.

* * * * *